J. B. Forsyth.
Hose Machine
No. 2,191 Reissued Mar. 13, 1866
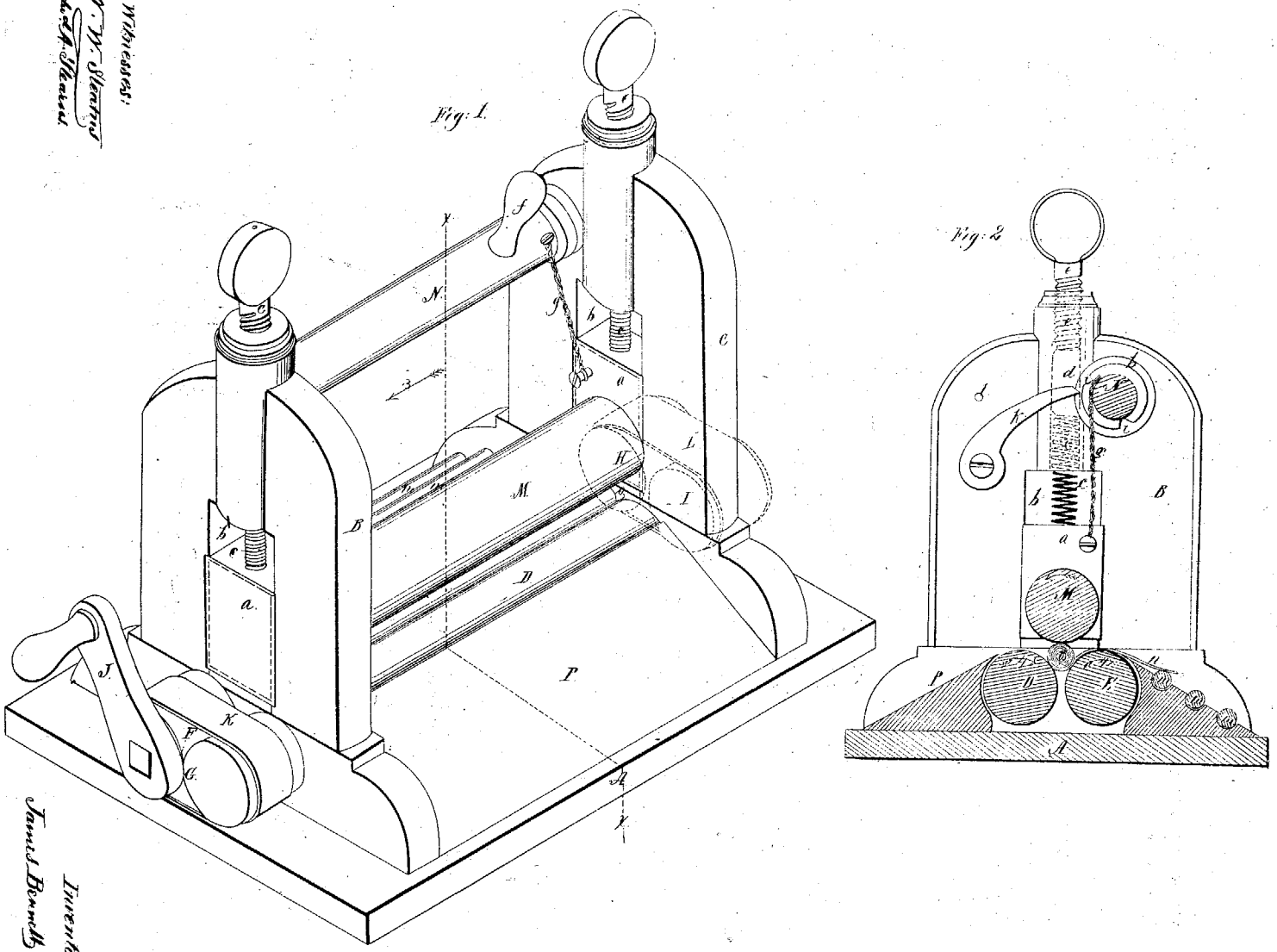
Witnesses:
N. W. Sleatins
Edw. A. Sleatins.
Inventor:
James Bennett Forsyth.

UNITED STATES PATENT OFFICE.

JAMES BENNETT FORSYTH, OF ROXBURY, MASSACHUSETTS, ASSIGNEE, BY MESNE ASSIGNMENTS, OF HIMSELF.

IMPROVED MACHINE FOR MAKING INDIA-RUBBER HOSE, BELTING, &c.

Specification forming part of Letters Patent No. 44,254, dated September 13, 1864; Reissue No. 2,191, dated March 13, 1866.

*To all whom it may concern:*

Be it known that I, JAMES BENNETT FORSYTH, of Roxbury, in the county of Norfolk and State of Massachusetts, have invented a machine for making hose, tubing, rolls, round packing, cord, and other similar articles of india rubber, or rubber and cloth, of which the following is a full, clear, and exact description, reference being had to the accompanying drawings, making part of this specification, in which—

Figure 1 is a view of the machine. Fig. 2 is a section on the line *x x* of Fig. 1, looking in the direction of the arrow 3.

Articles of rubber, or of rubber and cloth—such as hose, tubing, pressure-rolls, round packing, &c.—have heretofore been made entirely by hand.

In making hose the material was wrapped around a wooden or metallic mandrel of the required length and diameter and placed on a table, where it was pressed and laid on evenly by hand-rollers, which were run longitudinally over the folds after each partial revolution of the mandrel.

Where an article was required to be made solid—such as cord or round packing—the same operation was gone through with, excepting, instead of the mandrel, a narrow strip of sheet-rubber was used to start the roll. As only a small portion of the roll—say one-eighth of its circumference—was turned at one operation, the rubber was laid on at successive stages, which method was slow and laborious, and consequently expensive, while the work was frequently imperfectly finished.

The object of my invention is to overcome these difficulties, and consists in winding the material, either solid or around a mandrel, by placing it longitudinally between rolls or cylinders, which are revolved by any suitable power applied to gears or drums attached thereto.

To enable others skilled in the art to understand and use my invention, I will proceed to describe the manner in which I have carried it out.

In the said drawings, A is the bed of the machine, from which rise the standards B and C in permanent bearings, in which revolve the rolls D E, which carry at their extremities the drums or pulleys F G H I, (the latter two being shown in red, Fig. 1.) The roll D is revolved by any suitable power applied to the crank J, and communicates motion to the roll E by means of the endless belts K and L, which pass over the pulleys F G H I, thereby causing the rolls D and E to revolve in the direction shown by the arrows 4. (See Fig. 2.) The journals of the upper roll, M, have their bearings in movable boxes *a*, which rise and fall in recesses *b* within the standards.

Pressure is applied to the boxes *a* to force down the roll M in the following manner: Within each standard is a recess for the reception of a spring, *c*, its lower end resting in the top of the block *a*, while its upper end is covered by a cap-piece, *d*, (seen dotted in Fig. 2,) which is acted upon by a thumb-screw, *e*. A spindle, N, provided with a handle, *f*, has its bearings in the upper part of the standards, and is connected by chains *g* with the boxes *a*, in which the journals of the upper roll run. A collar, *h*, on one end of the spindle N, is provided with notches *i*, into which a pawl, *k*, falls when the roll M is required to be held up. A pin, *l*, acts as a stop to prevent the pawl from being thrown over too far.

*m* are friction-rolls having their bearings in the frame, and are arranged one above the other, so as to form an incline to facilitate the passage of the coated cloth or sheet *n* to the rolls D E and around the mandrel *o*, placed between them. *p* is an incline, down which the article rolls as it passes from the machine, the operation of which when making hose I will now describe. A strip of sheet-rubber is cut of sufficient width to form the size of the orifice desired, and, its edges, being shaved or trimmed down, may, if desired, be rubbed over with camphene or naphtha applied by a sponge. A mandrel of the proper diameter is then laid upon it and the edges brought up together and firmly fastened by a "stitching-iron," thus forming a tube around the mandrel. A piece of coated or prepared cloth of the right length and width to form the number of plies desired is then taken and one of its edges laid carefully on the tube, to which it adheres, the other end of the rubber cloth being fastened to another piece of sheet-rubber of the exact length and width to form the outer casing of the finished hose. The mandrel *o*, with the rubber attached, is now placed between the rolls D and E, and the upper roll, M, is released and forced down upon it by the pressure of the springs *c*. The rolls are set in motion by power applied to the crank J, and the plies of rubber, or rubber and cloth, are rapidly, uniformly, and compactly laid on, when the outside edge of the rubber covering is run over with a stitching-iron, which fastens it down securely. It is now necessary, in order to submit the hose to the vulcanizing process, to envelop it with several thicknesses of cloth, which is rolled on the hose by continuing to operate the rolls D, E, and M, as before described, one edge of the cloth being first laid on the hose to start it.

To keep the cloth covering tightly around the hose and to serve as an additional wrapping while the hose is being vulcanized, a narrow strip of cloth may be wound spirally around the cloth covering first put on. The cloth covering may be readily removed from the hose after vulcanization by replacing it between the rolls and revolving them in a contrary direction. I have spoken of the rolls D and E as having permanent bearings; but, if preferred, they may revolve in adjustable bearings, and, instead of the employment of chains for raising the upper roll, any other suitable device—such as gearing, bands, &c.—may be used for the purpose; and instead of the screws *e* and springs *c*, for forcing down the upper roll, pressure-rolls or their equivalents may be employed. When long rolls are used which would be liable to spring in the center, they may be supported by friction-rolls.

One of the above-mentioned machines, when in use, will perform in a given time as much as from four to ten men, depending on the description of the article made.

What I claim as my invention, and desire to secure by Letters Patent, is—

A machine for making hose, round packing, cord, wringer-rolls, tubing, and similar articles of rubber, (or other similar material,) rubber-cloth or rubber and cloth, consisting, essentially, of the rolls D, E, and M, operating substantially as described.

JAMES BENNETT FORSYTH.

Witnesses:
P. E. TESCHEMACHER,
N. W. STEARNS.